United States Patent
Ha et al.

(10) Patent No.: US 10,023,734 B2
(45) Date of Patent: Jul. 17, 2018

(54) THERMOPLASTIC RESIN COMPOSITION AND ARTICLE PRODUCED THEREFROM

(71) Applicant: Lotte Advanced Materials Co., Ltd., Yeosu-si (KR)

(72) Inventors: Sung Min Ha, Uiwang-si (KR); Young Chul Kwon, Uiwang-si (KR); Byeong Yeol Kim, Uiwang-si (KR); Yoen Kyoung Kim, Uiwang-si (KR); Cheon Seok Yang, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 77 days.

(21) Appl. No.: 15/334,386

(22) Filed: Oct. 26, 2016

(65) Prior Publication Data

US 2017/0121518 A1 May 4, 2017

(30) Foreign Application Priority Data

Oct. 29, 2015 (KR) .......................... 10-2015-0151379

(51) Int. Cl.
| C08L 83/04 | (2006.01) |
| C08L 33/20 | (2006.01) |
| C08F 279/02 | (2006.01) |
| C08L 33/12 | (2006.01) |

(52) U.S. Cl.
CPC ............ C08L 33/20 (2013.01); C08F 279/02 (2013.01); C08L 33/12 (2013.01); C08L 2201/10 (2013.01); C08L 2205/03 (2013.01); C08L 2205/06 (2013.01); C08L 2207/53 (2013.01)

(58) Field of Classification Search
CPC .. C08L 51/04; C08L 2207/53; C08L 2205/03; C08L 83/06
See application file for complete search history.

(56) References Cited

U.S. PATENT DOCUMENTS

| 5,384,383 A * | 1/1995 | Legrow ................. C07F 7/0849 528/23 |
| 8,314,182 B2 | 11/2012 | Ha et al. |
| 2014/0186612 A1 | 7/2014 | Kwon et al. |

FOREIGN PATENT DOCUMENTS

| JP | 02-274747 A | 11/1990 |
| KR | 10-2007-0108008 A | 11/2007 |
| KR | 10-2014-0087879 A | 7/2014 |

* cited by examiner

*Primary Examiner* — Jeffrey C Mullis
(74) *Attorney, Agent, or Firm* — Additon, Higgins & Pendleton, P.A.

(57) ABSTRACT

A thermoplastic resin composition includes a base resin including a rubber-modified vinyl graft copolymer and an aromatic vinyl resin, and a siloxane compound including a repeat unit represented by Formula 1 and a repeat unit represented by Formula 2, wherein the repeat unit represented by Formula 1 and the repeat unit represented by Formula 2 are present in a mole ratio of about 2: about 1 to about 4: about 1 in the siloxane compound:

[Formula 1]

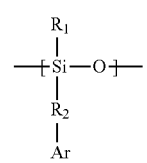

[Formula 2]

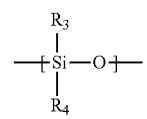

wherein $R_1$ and $R_3$ are each independently a hydrogen atom or a $C_1$ to $C_5$ alkyl group, $R_2$ is a $C_2$ to $C_{10}$ alkylene group, $R_4$ is $C_1$ to $C_{20}$ alkyl group, and Ar is a $C_6$ to $C_{20}$ aryl group.

13 Claims, No Drawings

THERMOPLASTIC RESIN COMPOSITION AND ARTICLE PRODUCED THEREFROM

CROSS-REFERENCE TO RELATED APPLICATION

This application claims priority under 35 USC Section 119 to and the benefit of Korean Patent Application 10-2015-0151379, filed on Oct. 29, 2015, in the Korean Intellectual Property Office, the entire disclosure of which is incorporated herein by reference.

FIELD

The present invention relates to a thermoplastic resin composition and a molded article produced from the same.

BACKGROUND

Tempered glass used as exterior materials for electric/electronic products has low impact strength, has difficulty reducing product weight due to a high specific gravity thereof, and has a problem of high manufacturing costs and high probability of breakage due to poor processability and tractability thereof. In order to address these problems, transparent resins can be used instead of tempered glass.

Examples of transparent resins used in products requiring transparency include polycarbonate resins, transparent acrylonitrile-butadiene-styrene (ABS) resins, styrene-acrylonitrile (SAN) resins, polystyrene resins, and poly(methyl methacrylate) (PMMA) resins. Polycarbonate resins can have good transparency and impact resistance, but can have a problem of high price and insufficient scratch resistance and chemical resistance. Transparent ABS resins such as methylmethacrylate-acrylonitrile-butadiene-styrene (MABS) resin can have transparency and impact resistance, but can have poor properties in terms of scratch resistance, heat resistance, and the like. Moreover, SAN resins, polystyrene resins, and PMMA resins can be difficult to use as exterior materials due to insufficient impact resistance thereof, despite advantages of low price and high transparency. Moreover, a typical transparent resin can be difficult to apply to exterior materials for electric/electronic products due to low mar resistance thereof and can have a problem of trade-off tendency between scratch resistance and mar resistance.

Therefore, there is a need for a transparent thermoplastic resin composition which has good properties in terms of impact resistance, transparency, scratch resistance, and mar resistance, and thus can be used as exterior materials for electric/electronic products (for example, as a substitute for tempered glass).

SUMMARY OF THE INVENTION

In exemplary embodiments, the present invention can provide a thermoplastic resin composition which can have good properties in terms of impact resistance, scratch resistance, mar resistance, and transparency, and a molded article produced from the same.

The thermoplastic resin composition includes: a base resin including a rubber-modified vinyl graft copolymer and an aromatic vinyl resin; and a siloxane compound including a repeat unit represented by the following Formula 1 and a repeat unit represented by the following Formula 2, wherein the repeat unit represented by Formula 1 and the repeat unit represented by Formula 2 are present in a mole ratio of about 2: about 1 to about 4: about 1 in the siloxane compound:

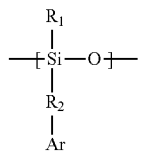

[Formula 1]

wherein $R_1$ is a hydrogen atom or a $C_1$ to $C_5$ alkyl group, $R_2$ is a $C_2$ to $C_{10}$ alkylene group, and Ar is a $C_6$ to $C_{20}$ aryl group;

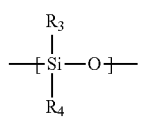

[Formula 2]

wherein $R_3$ is a hydrogen atom or a $C_1$ to $C_5$ alkyl group and $R_4$ is a $C_1$ to $C_{20}$ alkyl group.

In some embodiments, the thermoplastic resin composition may include about 100 parts by weight of the base resin including about 5% by weight (wt %) to about 25 wt % of the rubber-modified vinyl graft copolymer and about 75 wt % to about 95 wt % of the aromatic vinyl resin, and about 0.1 part by weight to about 10 parts by weight of the siloxane compound.

In some embodiments, the rubber-modified vinyl graft copolymer may be prepared by grafting an alkyl (meth)acrylate, an aromatic vinyl monomer and a vinyl cyanide monomer to a rubbery polymer.

In some embodiments, the rubbery polymer may have an average particle diameter of about 0.1 μm to about 0.5 μm.

In some embodiments, the aromatic vinyl resin may be obtained through copolymerization of an alkyl (meth)acrylate, an aromatic vinyl monomer and a vinyl cyanide monomer.

In some embodiments, the siloxane compound may have a number average molecular weight of about 3,000 g/mol to about 12,000 g/mol.

In some embodiments, the siloxane compound may have a refractive index of about 1.489 to about 1.518.

In some embodiments, a difference in refractive index between the base resin and the siloxane compound may be about 0.01 or less.

In some embodiments, the thermoplastic resin composition may have a notched Izod impact resistance of about 3.5 kgf·cm/cm or higher, as measured on an about ⅛" thick specimen in accordance with ASTM D256.

In some embodiments, the thermoplastic resin composition may have a scratch width of about 280 μm or less, as measured by a ball-type scratch profile test, and a pencil hardness of H or higher, as measured in accordance with ASTM D3362.

In some embodiments, the thermoplastic resin composition may have a difference in specular gloss (ΔGloss (60°)) of about 15 or less, as calculated by the following Equation 1:

Difference in specular gloss (ΔGloss))(60°))=|$G_0$−$G_1$|[Equation 1]

wherein $G_0$ is a 60° specular gloss measured on a specimen having a size of 10 cm×15 cm using a crockmeter in accordance with ASTM D523, and $G_1$ is a 60° specular gloss measured on the specimen after rubbing with a white cotton cloth 10 times.

In some embodiments, the thermoplastic resin composition may have a haze of about 3% or less and a light transmittance of about 87% or more, as measured on an about 2.5 mm thick specimen in accordance with ASTM D1003.

Other embodiments of the present invention relate to a molded article formed of the thermoplastic resin composition as set forth above.

DETAILED DESCRIPTION

The above and other aspects, features, and advantages of the present invention will become apparent from the detailed description of the following embodiments. It should be understood that the present invention is not limited to the following embodiments and may be embodied in different ways, and that the embodiments are provided for complete disclosure and thorough understanding of the present invention by those skilled in the art. The scope of the present invention should be defined only by the appended claims.

A thermoplastic resin composition according to the present invention includes:

(A) a base resin including (A1) a rubber-modified vinyl graft copolymer and (A2) an aromatic vinyl resin; and (B) a siloxane compound.

(A) Base Resin (A1) Rubber-Modified Vinyl Graft Copolymer

According to embodiments of the present invention, the rubber-modified vinyl graft copolymer can serve to improve transparency, impact resistance, flowability, and other properties of the thermoplastic resin composition and can be prepared by grafting an alkyl (meth)acrylate, an aromatic vinyl monomer and a monomer that is copolymerizable with the aromatic vinyl monomer such as a vinyl cyanide monomer to a rubbery polymer. For example, the rubber-modified vinyl graft copolymer may be obtained through graft copolymerization of a monomer mixture including the alkyl (meth)acrylate, the aromatic vinyl monomer and the vinyl cyanide monomer to the rubbery polymer, and may optionally further include a monomer for imparting processability and heat resistance in the monomer mixture. Here, copolymerization may be performed by any typical polymerization method known in the art, such as emulsion polymerization, suspension polymerization, and bulk polymerization.

Examples of the rubbery polymer may include without limitation diene rubbers such as polybutadiene, poly(styrene-butadiene), and poly(acrylonitrile-butadiene); saturated rubbers obtained by adding hydrogen to the diene rubbers; isoprene rubbers; acrylic rubbers such as poly(butyl acrylate); ethylene-propylene-diene terpolymers (EPDM), and the like. These may be used alone or as a mixture thereof. For example, the rubbery polymer may be a diene rubber, for example a butadiene rubber.

In some embodiments, the rubbery polymer (or rubber particles) may have an average (Z-average) particle diameter of about 0.1 µm to about 0.5 µm, for example, about 0.2 µm to about 0.4 µm. As used herein, the term average particle diameter refers to the Z-average mean size measured by the Mastersizer S Ver 2.14 (Malvern) in accordance with methods known in the art. Z-average particle diameter and methods for measuring the same are well known in the art and are readily understood by the skilled artisan. Within this range, the thermoplastic resin composition including the rubber-modified aromatic vinyl graft copolymer can exhibit good properties in terms of impact resistance, heat resistance, and flowability without deterioration in transparency.

In some embodiments, the rubber-modified vinyl graft copolymer can include the rubbery polymer in an amount of about 5 wt % to about 65 wt %, for example, about 10 wt % to about 30 wt %, based on the total weight (100 wt %) of the rubber-modified vinyl graft copolymer. In some embodiments, the rubber-modified vinyl graft copolymer can include the rubbery polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 wt %. Further, according to some embodiments, the amount of the rubbery polymer can be in a range from about any of the foregoing amounts to about any other of the foregoing amounts.

In some embodiments, the rubber-modified vinyl graft copolymer can include the monomer mixture (for example a monomer mixture including the alkyl (meth)acrylate, the aromatic vinyl monomer and the vinyl cyanide monomer) in an amount of about 35 wt % to about 95 wt %, for example, about 40 wt % to about 90 wt %, based on the total weight (100 wt %) of the rubber-modified vinyl graft copolymer. In some embodiments, the rubber-modified vinyl graft copolymer can include the monomer mixture in an amount of about 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments, the amount of the monomer mixture can be in a range from about any of the foregoing amounts to about any other of the foregoing amounts.

Within the above ranges, the thermoplastic resin composition can exhibit good properties in terms of impact resistance, transparency, heat resistance, flowability, and the like.

In some embodiments, the alkyl (meth)acrylate is graft-copolymerizable with the rubbery polymer and/or copolymerizable with the aromatic vinyl monomer. Examples of the alkyl (meth)acrylate may include without limitation $C_1$ to $C_{10}$ alkyl (meth)acrylates, such as methyl (meth)acrylate, ethyl (meth)acrylate, propyl (meth)acrylate, butyl (meth)acrylate, and the like, and mixtures thereof. For example, the alkyl (meth)acrylate may be methyl (meth)acrylate.

The monomer mixture can include the alkyl (meth)acrylate in an amount of about 55 mol % to about 85 mol %, for example, about 60 mol % to about 80 mol %, based on the total mole number (100 mol %) of the monomer mixture. In some embodiments, the monomer mixture can include the alkyl (meth)acrylate in an amount of about 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85 mol %. Further, according to some embodiments, the amount of the alkyl (meth)acrylate can be in a range from about any of the foregoing amounts to about any other of the foregoing amounts.

Within this range, the thermoplastic resin composition can exhibit good properties in terms of impact resistance, transparency, heat resistance, flowability, and the like.

In some embodiments, the aromatic vinyl monomer is graft-copolymerizable with the rubbery polymer. Examples of the aromatic vinyl monomer may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like. These may be used alone or as a mixture thereof.

The monomer mixture can include the aromatic vinyl monomer in an amount of about 10 mol % to about 40 mol %, for example, about 15 mol % to about 35 mol %, based on the total mole number (100 mol %) of the monomer mixture. In some embodiments, the monomer mixture can include the aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 mol %. Further, according to some embodiments, the amount of the aromatic vinyl monomer can be in a range from about any of the foregoing amounts to about any other of the foregoing amounts.

Within this range, the thermoplastic resin composition can exhibit good properties in terms of impact resistance, transparency, heat resistance, flowability, and the like.

In some embodiments, the vinyl cyanide monomer is copolymerizable with the aromatic vinyl monomer. Examples of the vinyl cyanide monomer may include without limitation acrylonitrile, methacrylonitrile, ethacrylonitrile, phenylacrylonitrile, α-chloroacrylonitrile, fumaronitrile, and the like. These may be used alone or as a mixture thereof. For example, the vinyl cyanide monomer can include acrylonitrile and/or methacrylonitrile.

The monomer mixture can include the vinyl cyanide monomer in an amount of about 1 mol % to about 30 mol %, for example, about 5 mol % to about 25 mol %, based on the total mole number (100 mol %) of the monomer mixture. In some embodiments, the monomer mixture can include the vinyl cyanide monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 mol %. Further, according to some embodiments, the amount of the vinyl cyanide monomer can be in a range from about any of the foregoing amounts to about any other of the foregoing amounts.

Within this range, the thermoplastic resin composition can exhibit good properties in terms of impact resistance, transparency, heat resistance, flowability, and the like.

Examples of the monomer for imparting processability and heat resistance may include without limitation (meth) acrylates, maleic anhydrides, N-substituted maleimides, and the like, and mixtures thereof. When present, the monomer mixture can include the monomer for imparting processability and heat resistance in an amount of about 15 mol % or less, for example, about 0.1 mol % to about 10 mol %, based on the total mole number (100 mol %) of the monomer mixture. In some embodiments, the monomer mixture can include the monomer for imparting processability and heat resistance in an amount about 0.1, 0.2, 0.3, 0.4, 0.5, 0.6, 0.7, 0.8, 0.9, 1, 2, 3, 4, 5, 6, 7, 8, 9, 10, 11, 12, 13, 14, or 15 mol %. Further, according to some embodiments, the amount of the monomer for imparting processability and heat resistance can be in a range from about any of the foregoing amounts to about any other of the foregoing amounts.

Within this range, the monomer can provide processability and heat resistance to the thermoplastic resin composition.

An example of the rubber-modified vinyl graft copolymer can include without limitation a methyl methacrylate-acrylonitrile-butadiene-styrene graft copolymer resin (g-MABS). Here, the g-MABS may be composed of a polybutadiene (PBD) core, which is a rubbery polymer, and a methyl methacrylate-acrylonitrile-styrene copolymer shell grafted to the core, wherein the shell may include an inner shell composed of an acrylonitrile-styrene resin and an outer shell of poly(methyl methacrylate), without being limited thereto.

In some embodiments, the base resin can include the rubber-modified vinyl graft copolymer in an amount of about 5 wt % to about 25 wt %, for example, about 10 wt % to about 20 wt %, based on the total weight (100 wt %) of the base resin. In some embodiments, the base resin can include the rubber-modified vinyl graft copolymer in an amount of about 5, 6, 7, 8, 9, 10, 11, 12, 13, 14, 15, 16, 17, 18, 19, 20, 21, 22, 23, 24, or 25 wt %. Further, according to some embodiments, the amount of the rubber-modified vinyl graft copolymer can be in a range from about any of the foregoing amounts to about any other of the foregoing amounts.

Within this range, the thermoplastic resin composition can exhibit good properties in terms of transparency, impact resistance, heat resistance, flowability, and balance therebetween.

(A2) Aromatic Vinyl Resin

According to embodiments of the invention, the aromatic vinyl resin can serve to improve impact resistance and transparency of the thermoplastic resin composition, and can be a polymer of a monomer mixture including an alkyl (meth)acrylate, an aromatic vinyl monomer, and a monomer that is copolymerizable with the aromatic vinyl monomer such as a vinyl cyanide monomer. For example, the aromatic vinyl resin may be obtained by reacting the monomer mixture by any typical polymerization method known in the art. In some embodiments, the aromatic vinyl resin may optionally further include a monomer for imparting processability and heat resistance in the monomer mixture.

In some embodiments, the alkyl (meth)acrylate is graft-copolymerizable with the rubbery copolymer and/or copolymerizable with the aromatic vinyl monomer. Examples of the alkyl (meth)acrylate may include without limitation $C_1$ to $C_{10}$ alkyl (meth)acrylates, such as methyl (meth)acrylate, ethyl (meth)acrylate, propyl (meth)acrylate, butyl (meth) acrylate, and the like, and mixtures thereof. For example, the alkyl (meth)acrylate may include methyl (meth)acrylate.

The monomer mixture can include the alkyl (meth)acrylate in an amount of about 55 mol % to about 85 mol %, for example, about 60 mol % to about 80 mol %, based on the total mole number (100 mol %) of the monomer mixture. In some embodiments, the monomer mixture can include the alkyl (meth)acrylate in an amount of about 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85 mol %. Further, according to some embodiments, the amount of the alkyl (meth)acrylate can be in a range from about any of the foregoing amounts to about any other of the foregoing amounts.

Within this range, the thermoplastic resin composition can exhibit good properties in terms of impact resistance, transparency, heat resistance, flowability, and the like.

In some embodiments, the aromatic vinyl monomer is graft-copolymerizable with the rubbery copolymer. Examples of the aromatic vinyl monomer can include without limitation styrene, α-methylstyrene, β-methyl styrene, p-methyl styrene, p-t-butyl styrene, ethyl styrene, vinylxylene, monochlorostyrene, dichlorostyrene, dibromostyrene, vinyl naphthalene, and the like. These may be used alone or as a mixture thereof.

The monomer mixture can include the aromatic vinyl monomer in an amount of about 10 mol % to about 40 mol %, for example, about 15 mol % to about 35 mol %, based on the total mole number (100 mol %) of the monomer mixture. In some embodiments, the monomer mixture can include the aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 mol %. Further, according to some embodiments, the amount of the aromatic vinyl monomer can be in a range from about any of the foregoing amounts to about any other of the foregoing amounts.

Within this range, the thermoplastic resin composition can exhibit good properties in terms of impact resistance, transparency, heat resistance, flowability, and the like.

In some embodiments, the vinyl cyanide monomer is copolymerizable with the aromatic vinyl monomer. Examples of the vinyl cyanide monomer can include without limitation acrylonitrile, methacrylonitrile, ethacrylonitrile, phenylacrylonitril, α-chloroacrylonitrile, fumaronitrile, and the like. These may be used alone or as a mixture thereof. For example, the vinyl cyanide monomer can include acrylonitrile and/or methacrylonitrile.

The monomer mixture can include the vinyl cyanide monomer in an amount of about 1 mol % to about 30 mol %, for example, about 5 mol % to about 25 mol %, based on the total mole number (100 mol %) of the monomer mixture. In some embodiments, the monomer mixture can include the vinyl cyanide monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 mol %. Further, according to some embodiments, the amount of the vinyl cyanide monomer can be in a range from about any of the foregoing amounts to about any other of the foregoing amounts.

Within this range, the thermoplastic resin composition can exhibit good properties in terms of impact resistance, transparency, heat resistance, flowability, and the like.

In some embodiments, the monomer mixture can include a monomer for imparting processability and heat resistance. Examples of the monomer for imparting processability and heat resistance may include without limitation (meth)acrylates, maleic anhydride, N-substituted maleimides, and the like, and mixtures thereof.

When present, the monomer mixture can include the monomer for imparting processability and heat resistance in an amount of about 15 mol % or less, for example, about 0.1 mol % to about 10 mol %, based on the total mole number (100 mol %) of the monomer mixture. In some embodiments, the monomer mixture can include the monomer for imparting processability and heat resistance in an amount about 0.1, 0.2, 0.3, 0.4, 0.5, 0.6, 0.7, 0.8, 0.9, 1, 2, 3, 4, 5, 6, 7, 8, 9, 10, 11, 12, 13, 14, or 15 mol %. Further, according to some embodiments, the amount of the monomer for imparting processability and heat resistance can be in a range from about any of the foregoing amounts to about any other of the foregoing amounts.

Within this range, the monomer can provide processability and heat resistance to the thermoplastic resin composition.

In some embodiments, the aromatic vinyl resin may have a weight average molecular weight of about 50,000 g/mol to about 200,000 g/mol, for example, about 100,000 g/mol to about 180,000 g/mol, as measured by gel permeation chromatography (GPC). Within this range, the thermoplastic resin composition can exhibit good properties in terms of heat resistance and processability.

In some embodiments, the base resin can include the aromatic vinyl resin in an amount of about 75 wt % to about 95 wt %, for example, about 80 wt % to about 90 wt %, based on the total weight (100 wt %) of the base resin. In some embodiments, the base resin can include the aromatic vinyl resin in an amount of about 75, 76, 77, 78, 79, 80, 81, 82, 83, 84, 85, 86, 87, 88, 89, 90, 91, 92, 93, 94, or 95 wt %. Further, according to some embodiments, the amount of the aromatic vinyl resin can be in a range from about any of the foregoing amounts to about any other of the foregoing amounts.

Within this range, the thermoplastic resin composition can exhibit good properties in terms of transparency, impact resistance, heat resistance, flowability, and balance therebetween.

By way of example, the base resin may be a methyl methacrylate-acrylonitrile-butadiene-styrene copolymer (MABS) resin, which is a mixture of methyl methacrylate-acrylonitrile-butadiene-styrene graft copolymer (g-MABS) and methyl methacrylate-styrene-acrylonitrile copolymer (MSAN), without being limited thereto. Here, the MABS resin may be prepared in the form wherein g-MABS is dispersed in MSAN.

(B) Siloxane Compound

According to embodiments of the present invention, the siloxane compound can improve impact resistance, scratch resistance and mar resistance of the thermoplastic resin composition with minimal or no deterioration in transparency thereof, and includes a repeat unit represented by the following Formula 1 and a repeat unit represented by the following Formula 2:

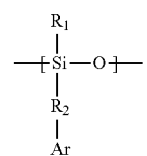

[Formula 1]

wherein $R_1$ is a hydrogen atom or a $C_1$ to $C_5$ alkyl group, for example, a methyl group, an ethyl group, a propyl group, or a butyl group; $R_2$ is a $C_2$ to $C_{10}$ alkylene group, for example, an ethylene group, a propylene group, a butylene group, a pentylene group, or a hexylene group; and Ar is a $C_6$ to $C_{20}$ aryl group, for example, a phenyl group or a naphthyl group; and

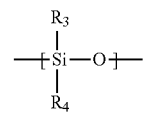

[Formula 2]

wherein $R_3$ is a hydrogen atom or a $C_1$ to $C_5$ alkyl group, for example, a methyl group, an ethyl group, a propyl group, or a butyl group, and $R_4$ is a $C_1$ to $C_{20}$ alkyl group, for example, a $C_5$ to $C_{20}$ alkyl group.

In some embodiments, the repeat unit represented by Formula 1 and the repeat unit represented by Formula 2 may be present in a mole ratio (Formula 1:Formula 2) of about 2 : about 1 to about 4 : about 1, for example, about 2.2 : about 1 to about 3.8 : about 1. If the mole ratio of the repeat unit represented by Formula 1 to the repeat unit represented by Formula 2 is less than about 2 : about 1 or is greater than about 4 : about 1, the thermoplastic resin composition can suffer from deterioration in transparency, color, and the like.

In some embodiments, the siloxane compound may be prepared by reacting a linear siloxane compound and/or a cyclic siloxane compound including the repeat unit represented by Formula 1 with a linear siloxane compound and/or a cyclic siloxane compound including the repeat unit represented by Formula 2 in the above mole ratio by any method known in the art, without being limited thereto.

In some embodiments, the siloxane compound may have a number average molecular weight (Mn) of about 3,000 g/mol to about 12,000 g/mol, for example, about 5,000 g/mol to about 10,000 g/mol, as measured by gel permeation chromatography (GPC). Within this range, the thermoplastic resin composition can exhibit good properties in terms of heat resistance, compatibility, flowability, scratch resistance, mar resistance, and the like.

In some embodiments, the siloxane compound may have a refractive index of about 1.489 to about 1.518, for example, about 1.492 to about 1.515, and a difference in refractive index between the base resin and the siloxane compound may be about 0.01 or less, for example, about 0.001 to about 0.006. Within this range, the thermoplastic resin composition can exhibit good transparency.

In some embodiments, the thermoplastic resin composition can include the siloxane compound in an amount of about 0.1 to about 10 parts by weight, for example, about 0.5 to about 7 parts by weight, and as another example about 1 to about 6 parts by weight, based on about 100 parts by weight of the base resin. In some embodiments, the thermoplastic resin composition can include the siloxane compound in an amount of about 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments, the amount of the siloxane compound can be in a range from about any of the foregoing amounts to about any other of the foregoing amounts.

Within this range, the thermoplastic resin composition can exhibit good properties in terms of impact resistance, scratch resistance, mar resistance, transparency, and balance therebetween.

The thermoplastic resin composition according to some embodiments of the invention may further include one or more additives. Examples of the additives can include without limitation flame retardants, fillers, antioxidants, lubricants, release agents, nucleating agents, antistatic agents, stabilizers, colorants, and the like, and mixtures thereof with minimal or no effect on or alteration of the effects of the present invention. In the thermoplastic resin composition, the additives may be present in an amount of about 10 parts by weight or less, for example, about 0.1 to about 10 parts by weight, based on about 100 parts by weight of the base resin.

The thermoplastic resin composition according to some embodiments of the invention may have a notched Izod impact strength of about 3.5 kgf·cm/cm or higher, for example, about 3.5 kgf·cm/cm to about 20 kgf·cm/cm, as measured on an about 1/8" thick specimen in accordance with ASTM D256. Within this range, the thermoplastic resin composition can have good impact resistance and thus can be useful as exterior materials for electric/electronic products.

In some embodiments, the thermoplastic resin composition may have a scratch width of about 280 μm or less, for example, about 150 μm to about 275 μm, as measured by the ball type scratch profile test, and a pencil hardness of H or higher, for example, H, 2H or 3H, as measured in accordance with ASTM D3362. Within these ranges, the thermoplastic resin composition can have good scratch resistance and thus can be useful as exterior materials for electric/electronic products.

In some embodiments, the thermoplastic resin composition may have a difference in specular gloss (ΔGloss (60°)) of about 15 or less, for example, about 5 to about 15, as calculated by the following Equation 1:

$$\text{Difference in specular gloss } (\Delta\text{Gloss } (60°)) = |G_0 - G_1| \quad \text{[Equation 1]}$$

wherein $G_0$ is a 60° specular gloss measured on a specimen having a size of 10 cm×15 cm using a crockmeter in accordance with ASTM D523, and $G_1$ is a 60° specular gloss measured on the specimen after rubbing with a white cotton cloth 10 times.

In some embodiments, the thermoplastic resin composition can have a difference in specular gloss (ΔGloss (60°)) of about 5, 6, 7, 8, 9, 10, 11, 12, 13, 14, or 15, as calculated by the above Equation 1.

A lower difference in specular gloss indicates better mar resistance. Within this range, the thermoplastic resin composition can have good mar resistance and thus can be useful as exterior materials for electric/electronic products.

In some embodiments, the thermoplastic resin composition may have a haze of about 3% or less, for example, about 0.1 to about 2.5%, and a light transmittance of about 87% or higher, for example, about 89% to about 96%, as measured on an about 2.5 mm thick specimen in accordance with ASTM D1003. Within these ranges, the thermoplastic resin composition can exhibit sufficient transparency and thus can be useful as a substitute for tempered glass.

A molded article according to embodiments of the invention is formed of the thermoplastic resin composition as set forth above. The thermoplastic resin composition may be prepared by any suitable thermoplastic resin composition preparation method known in the art. For example, the aforementioned components and, optionally, the additives can be mixed, followed by melt extrusion in an extruder, thereby preparing a thermoplastic resin composition in pellet form. The prepared pellets may be produced into various molded articles (products) by various molding methods such as injection molding, extrusion, vacuum molding, and casting. Such molding methods are well known to those skilled in the art. The molded article may be applied to various fields such as interior/exterior materials for electric/electronic products and automotive parts. For example, the molded article can be useful as a substitute for tempered glass, which is typically used as exterior materials for electric/electronic products.

Hereinafter, the present invention will be described in more detail with reference to the following examples. It should be understood that these examples are provided for illustration only and are not to be construed in any way as limiting the present invention.

EXAMPLES

Details of components used in the following Examples and Comparative Examples are as follows.

(A) Rubber-Modified Vinyl Graft Copolymer

A core-shell type graft copolymer (g-MABS) prepared by grafting 40 wt % of styrene, acrylonitrile, and methyl methacrylate (styrene/acrylonitrile/methyl methacrylate: 20 mol %/10 mol %/70 mol %) to 60 wt % of butadiene rubber having an average particle diameter of 0.27 μm is used.

(B) Aromatic Vinyl Resin

A resin (weight average molecular weight: 160,000 g/mol) prepared through polymerization of 70 mol % of methyl methacrylate, 20 mol % of styrene, and 10 mol % of acrylonitrile is used.

(C) Siloxane Compound (C1) A siloxane compound (number average molecular weight: 7,600 g/mol, refractive index: 1.514) comprising a repeat unit represented by the following Formula 1a and a repeat unit represented by the following Formula 1b in a mole ratio of 3:1 (Formula 1a:Formula 1b) is used.

[Formula 1a]

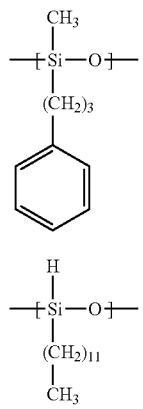

[Formula 1b]

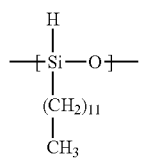

(C2) A siloxane compound (number average molecular weight: 8,100 g/mol, refractive index: 1.487) comprising a repeat unit represented by the above Formula 1a and a repeat unit represented by the above Formula 1b in a mole ratio of 1:1 (Formula 1a:Formula 1b) is used.

(C3) A siloxane compound (number average molecular weight: 7,500 g/mol, refractive index: 1.520) comprising a repeat unit represented by the above Formula 1a and a repeat unit represented by the above Formula 1b in a mole ratio of 5:1 (Formula 1a:Formula 1b) is used.

Example 1 to 4 and Comparative Example 1 to 3

The above components are mixed in a twin-screw extruder (L/D=35, ϕ=45 mm) at 230° C. in amounts as listed in Table 1, followed by melt extrusion, thereby preparing a thermoplastic resin composition in pellet form. The prepared pellets are dried at 80° C. for 4 hours or more, followed by injection molding using an injection molding machine at an injection temperature of 230° C. and at a mold temperature of 60°C., thereby preparing a specimen. The prepared specimen is evaluated as to the following properties, and results are shown in Table 1.

Property Measurement (1) Notched Izod impact strength (unit: kgf·cm/cm): Izod impact strength is measured on a ⅛" thick notched specimen in accordance with ASTM D256. A higher value indicates better impact resistance.

(2) Scratch width (unit: μm): Scratch width is measured by the ball-type scratch profile (BSP) test. A scratch having a length of 10 mm to 20 mm is made on a surface of a specimen having a size of L90 mm×W50 mm×2.5 mm under a load of 1,000 g at a scratch speed of 75 mm/min using a spherical metal tip having a diameter of 0.7 mm. A profile of the scratch is scanned with a metal stylus tip having a diameter of 2 μm using a contact-type surface profile analyzer (XP-1, Ambios Technology), thereby measuring a scratch width as a measure of scratch resistance. A lower value indicates better scratch resistance.

(3) Pencil hardness: Pencil hardness is measured under a load of 500 g in accordance with ASTM D3362. In terms of scratch resistance, a specimen is rated as 3B, 2B, B, HB, F, H, 2H, 3H, and so on. A higher H value indicates better scratch resistance and a higher B value indicates poorer scratch resistance.

(4) Difference in specular gloss (ΔGloss (60°)): Difference in specular gloss (ΔGloss (60°)) is calculated by the following Equation 1. A lower difference in specular gloss indicates better mar resistance.

$$\text{Difference in specular gloss } (\Delta\text{Gloss }(60°)) = |G_0 - G_1| \qquad \text{[Equation 1]}$$

wherein $G_0$ is a 60° specular gloss measured on a specimen having a size of 10 cm×15 cm using a crockmeter in accordance with ASTM D523, and $G_1$ is a 60° specular gloss measured on the specimen after rubbing with a white cotton cloth 10 times.

(5) Haze and light transmittance (unit: %): Haze and light transmittance (total luminous transmittance) are measured on a 2.5 mm thick specimen using a haze meter (NDH 2000, Nippon Denshoku Industries Co., Ltd.) in accordance with ASTM D1003.

TABLE 1

|  |  | Example | | | | Comparative Example | | |
| --- | --- | --- | --- | --- | --- | --- | --- | --- |
|  |  | 1 | 2 | 3 | 4 | 1 | 2 | 3 |
| (A) (wt %) | | 10 | 15 | 15 | 20 | 15 | 15 | 15 |
| (B) (wt %) | | 90 | 85 | 85 | 80 | 85 | 85 | 85 |
| (C) (parts by weight) | (C1) | 3 | 3 | 5 | 3 | — | — | — |
| | (C2) | — | — | — | — | 3 | — | — |
| | (C3) | — | — | — | — | — | 3 | — |
| Difference in refractive index between (A) + (B) and (C) | | 0.001 | 0.001 | 0.001 | 0.001 | 0.026 | 0.007 | — |
| Notched Izod impact resistance (kgf · cm/cm) | | 4 | 7 | 7 | 11 | 7 | 7 | 15 |
| BSP scratch width (μm) | | 232 | 258 | 245 | 272 | 259 | 262 | 310 |
| Pencil hardness | | 2H | H | H | H | H | H | HB |
| Difference in specular gloss | | 5 | 8 | 7 | 15 | 10 | 12 | 35 |
| Haze (%) | | 1.9 | 2.1 | 2.3 | 2.4 | 3.5 | 3.4 | 1.8 |
| Light transmittance (%) | | 90.9 | 90.2 | 90.1 | 89.3 | 86.5 | 87.3 | 90.2 |

* parts by weight: relative to 100 parts by weight of base resin ((A) + (B))

From the results of Table 1, it can be seen that the thermoplastic resin compositions according to the present invention (Examples 1 to 4) exhibit good properties in terms of impact resistance, scratch resistance, mar resistance, transparency, and balance therebetween and are suitable as a substitute for tempered glass.

Conversely, the thermoplastic resin compositions of Comparative Examples 1 and 2, which are prepared using the siloxane compounds (C2, C3) comprising the repeat units in mole ratios out of the range according to the present invention suffer from significant deterioration in transparency (haze, light transmittance) and/or can have low scratch resistance and/or mar resistance at the same amounts, and the thermoplastic resin composition of Comparative Example 3, which is prepared without using the siloxane compounds, suffers from significant deterioration in scratch resistance and mar resistance.

Example embodiments have been disclosed herein, and although specific terms are employed, they are used and are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, and alterations can be made by those skilled in the art without departing from the spirit and scope of the invention. Therefore, the scope of the present invention should be defined by the appended claims and equivalents thereof

What is claimed is:

1. A thermoplastic resin composition comprising:
a base resin comprising a rubber-modified vinyl graft copolymer and an aromatic vinyl resin; and
a siloxane compound comprising a repeat unit represented by the following Formula 1 and a repeat unit represented by the following Formula 2,
wherein the repeat unit represented by Formula 1 and the repeat unit represented by Formula 2 are present in a mole ratio of about 2: about 1 to about 4: about 1 in the siloxane compound:

[Formula 1]

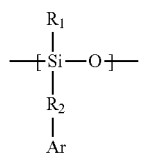

wherein $R_1$ is a hydrogen atom or a $C_1$ to $C_5$ alkyl group, $R_2$ is a $C_2$ to $C_{10}$ alkylene group, and Ar is a $C_6$ to $C_{20}$ aryl group;

[Formula 2]

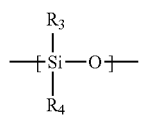

wherein $R_3$ is a hydrogen atom or a $C_1$ to $C_5$ alkyl group and $R_4$ is a $C_1$ to $C_{20}$ alkyl group.

2. The thermoplastic resin composition according to claim 1, wherein the thermoplastic resin composition comprises about 100 parts by weight of the base resin comprising about 5 wt % to about 25 wt % of the rubber-modified vinyl graft copolymer and about 75 wt % to about 95 wt % of the aromatic vinyl resin, and about 0.1 part by weight to about 10 parts by weight of the siloxane compound.

3. The thermoplastic resin composition according to claim 1, wherein the rubber-modified vinyl graft copolymer is prepared through graft copolymerization of an alkyl (meth) acrylate, an aromatic vinyl monomer and a monomer copolymerizable with the aromatic vinyl monomer to a rubbery polymer.

4. The thermoplastic resin composition according to claim 3, wherein the rubbery polymer has an average particle diameter of about 0.1 μm to about 0.5 μm.

5. The thermoplastic resin composition according to claim 1, wherein the aromatic vinyl resin is obtained through copolymerization of an alkyl (meth)acrylate, an aromatic vinyl monomer and a monomer copolymerizable with the aromatic vinyl monomer.

6. The thermoplastic resin composition according to claim 1, wherein the siloxane compound has a number average molecular weight of about 3,000 g/mol to about 12,000 g/mol.

7. The thermoplastic resin composition according to claim 1, wherein the siloxane compound has a refractive index of about 1.489 to about 1.518.

8. The thermoplastic resin composition according to claim 1, wherein a difference in refractive index between the base resin and the siloxane compound is about 0.01 or less.

9. The thermoplastic resin composition according to claim 1, wherein the thermoplastic resin composition has a notched Izod impact resistance of about 3.5 kgf·cm/cm or higher, as measured on an about ⅛" thick specimen in accordance with ASTM D256.

10. The thermoplastic resin composition according to claim 1, wherein the thermoplastic resin composition has a scratch width of about 280 μm or less as measured by a ball-type scratch profile test, and a pencil hardness of H or higher as measured in accordance with ASTM D3362.

11. The thermoplastic resin composition according to claim 1, wherein the thermoplastic resin composition has a difference in specular gloss (ΔGloss (60°)) of about 15 or less, as calculated by the following Equation 1:

Difference in specular gloss (ΔGloss (60°))=|$G_0-G_1$|  [Equation]

wherein $G_0$ is a 60° specular gloss measured on a specimen having a size of 10 cm×15 cm using a crockmeter in accordance with ASTM D523, and $G_1$ is a 60° specular gloss measured on the specimen after rubbing with a white cotton cloth 10 times.

12. The thermoplastic resin composition according to claim 1, wherein the thermoplastic resin composition has a haze of about 3% or less and a light transmittance of about 87% or more, as measured on an about 2.5 mm thick specimen in accordance with ASTM D1003.

13. A molded article formed of the thermoplastic resin composition according to claim 1.

* * * * *